United States Patent Office 3,010,690
Patented Nov. 28, 1961

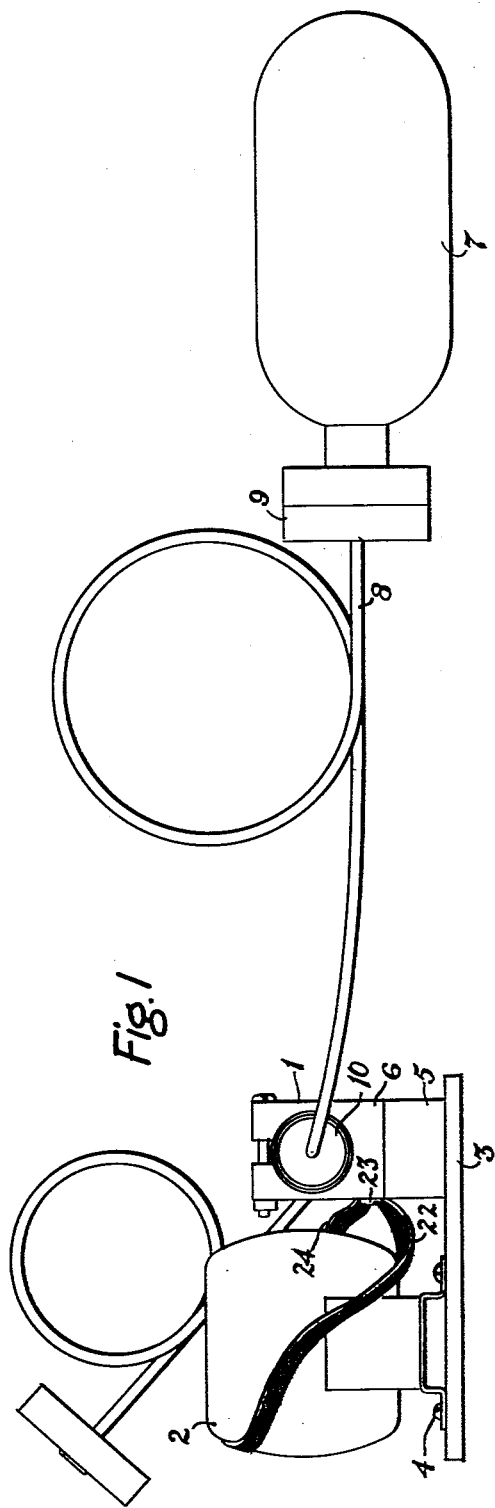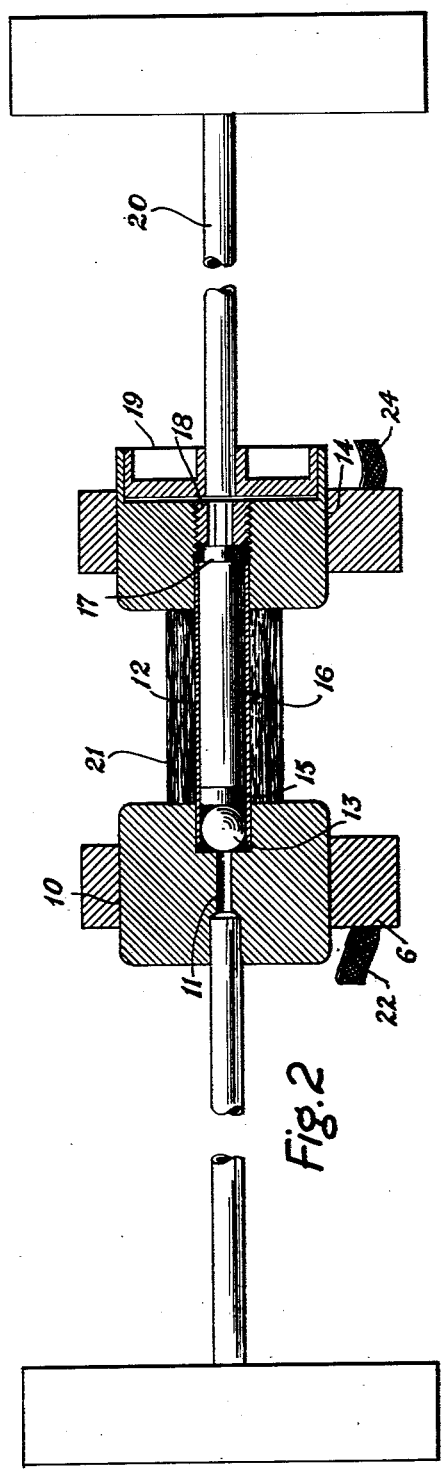

3,010,690
THERMOMECHANICAL LEAK
Alfred J. Gale, Lexington, Mass., assignor to Electronized Chemicals Corporation, Wilmington, Del., a corporation of Delaware
Filed July 27, 1959, Ser. No. 829,570
3 Claims. (Cl. 251—11)

This invention relates to gas leaks and in particular to a novel type of gas leak using thermomechanical principles. A gas leak is a device which provides a valving action for the introduction of gas into a vacuum region. Such gas leaks are useful, for example, in positive ion accelerators where the positive ions are created in a gas discharge but then must be accelerated in an evacuated region. Since the ion source must be in open communication with the vacuum region in order to permit transfer of positive ions from the former to the latter, there is a constant loss of gas through this aperture into the evacuated region from which it is removed by conventional pumps. That is to say, not only positive ions but also neutral gas molecules continually escape from the ion source. Consequently, there has to be a source of replenishment of gas for the ion source which should be introduced into the ion source at approximately the rate at which gas is lost therefrom. In the usual positive ion accelerator a small container or cylinder of gas under pressure is provided adjacent the ion source to which it is connected via appropriate tubing and a gas leak.

Various conventional leaks have been proposed. A common gas leak used in connection with hydrogen is a palladium leak which utilizes the fact that palladium is permeable to hydrogen and the permeability is a function of temperature. However, the palladium leak is not suitable for gases other than hydrogen. Other proposed gas leaks include the Cavendish leak and the magnetostrictive gas leak described and claimed in U.S. Patent No. 2,887,294 to Hahn, which patent also includes a brief description of the Cavendish leak.

The present invention comprehends a thermomechanical leak of novel design wherein a conventional ball-type socket is opened and closed by novel thermal means which are activated by an electric current. The specific means employed includes a tube of conductive material into which the ball of the ball-type joint fits and which contains means to hold the ball against the valve seat when no electric current flows through the tube. When electric current is caused to flow through this tube the resistance thereof causes it to heat and expand, and the expansion of the tube permits the ball to be separated from the valve seat.

The invention may best be understood from the following detailed description thereof having reference to the accompanying drawing in which:

FIG. 1 is a side view of a thermomechanical leak assembly constructed in accordance with the invention; and FIG. 2 is a view in longitudinal central section of the thermomechanical leak sub-assembly associated with the thermomechanical leak assembly shown in FIG. 1.

Referring to the drawing and first to FIG. 1 thereof, a thermomechanical leak sub-assembly 1 and a transformer 2 are supported upon a leak mounting plate 3. The transformer 2 may be, for example, a .5 volt 70 ampere 400 cycle transformer and is affixed to the leak mounting plate 3 directly by means of screws 4. The transformer 2 may have taps (not shown) for choosing a current for best performance. The thermomechanical leak sub-assembly 1 may be supported upon a leak base 5 by means of a mechanical leak clamp 6 and the leak base 5 in turn supported upon the leak mounting plate 3. The leak mounting plate 3 in turn is supported in the appropriate region. For example, it may be supported in the vicinity of the ion source of a positive ion accelerator (not shown). A gas cylinder 7 is connected to one end of a two-foot length of ⅛ O.D. copper tubing 8 by means of an appropriate gasketed flange 9. The other end of this length of copper tubing 8 is connected to one end of a ball-body 10 which forms part of the thermomechanical leak sub-assembly 1 as shown in FIG. 2.

Referring now to FIG. 2, the ball body 10 includes a central aperture 11 one end of which is connected to the copper tubing 8 leading to the gas cylinder 7 and the other end of which is widened so as to receive an Inconel tube 12 which fits over a 3/16 inch diameter stainless steel ball 13 as shown. The aperture 11 thus forms a valve seat into which the ball 13 fits to provide the requisite valving action. The other end of the tube 12 is received by a screw body 14. The ball 13 is held against the ball-body 10 by means of a first 3/16 inch diameter x 1/16 inch thick tungsten wafer 15, a 3/16 inch diameter x 13/16 inch long pyroceram (quartz) rod 16, and a second wafer 17 arranged in that order between the ball 13 and a set screw 18 which is adjusted so that the valve is closed when no electric current flows through the tube 12. A cap 19 fits into the screw body 14 and is welded to the screw body 14 in the final step of manufacture assembly. One end of a one-foot length of ⅛ O.D. copper tubing 20 is soldered into the cap 19 and the other end is connected to the vacuum system (not shown) into which the gas is to be introduced such as, for example, the ion source of a positive ion accelerator.

The tube 12 is surrounded by a ¾ inch wide winding of Fiberglas base tape 21 which serves to insulate the tube 12 thermally so that no temperature effects are obtained other than those created by the electric current flowing through the tube 12. The tube 12 itself is soldered to the ball-body 10 and the screw-body 14. The thermomechanical leak is a gas flow control unit for introducing gas into the source of an acceleration tube and is not limited to the type of gas used. It may be installed at the factory or added to an existing accelerator with a minimum of modifications. The body of the thermomechanical leak is made in three pieces. The ends are stainless steel and the thin wall tubing connecting them is Inconel. Inconel is chosen for its resistance to heat, oxidation and corrosion. Of the material used, some of the more important properties are as listed in Table I.

Table I

| Comparison of Properties | Inconel | 304.S.S. | Tungsten |
|---|---|---|---|
| Thermal Coefficient of Expansion, ″/″/° F. ×10⁻⁶ | 6.4 | 9.6 | 2.4 |
| Electrical Resistivity, microhm-cm | 98 | 72 | 5.5 |
| Thermal Conductivity | .128 | .130 | .399 |

The insulating insert (Pyroceram 9608) gives its properties as:

Linear coefficient of expansion _____ 7–20
Volume resistivity log 10 (ohm-cm.) 250° C _____ 8.1
Thermal conductivity (c.g.s.) 25° C. mean temp __ .0047

It is apparent from Table I that the internal components will expand less than the external thin wall Inconel tubing. As there is a mechanical force applied through the internal components to the steel ball covering the small hole, no leakage or gas flow can occur. When current is applied through the restricting thin wall tubing, by affixing one output lead 22 of the transformer 2 to a connecting post 23 on the ball body 10 and the other output lead 24 of the transformer 2 to a similar connecting post (not shown) on the screw body 14, a rise in temperature causes the tubing to expand, relaxing the force on the internal components, allowing the gas to flow. Since the output of the transformer 2 is lowvoltage (.5 volt) high-current (70 amperes) the output leads 22, 24 should be heavy braid, as shown, and insulation problems are almost negligible. Thus, although the leak base 5 should be insulating and although the gas cylinder 7 should be supported on an insulating support, such as insulating straps (not shown), the amount of insulation required is very slight.

In a representative thermomechanical leak constructed in accordance with the invention, the following materials were used and the expansion of each portion was as shown in Table II.

*Table II*

| No. Req'd | Material | Portion Expanded, $''/''/°$ F. $\times 10^{-6}$ |
|---|---|---|
| 1 | 3/16" dia. st. st. ball | 1.79 |
| 2 | 3/16" dia. x 1/16" thick tungsten wafer | .30 |
| 1 | 3/16" dia. x 13/16" pyroceram rod | .20 |
| Total | | 2.29 |
| 1 | Inconel tube 3/4" long | 4.80 |
| | Less internal components | 2.29 |
| Expansion difference | | $2.51 \times 10^{-6}$ |

Gas flow for conventional charged particle positive ion accelerators varies between one to ten cubic-centimeters per hour. The above specified thermomechanical leak was designed for a gas flow beyond this range to insure flooding of the ion source. All thermomechanical leaks tested had to pass three basic performance checks. First, positive-close-off of gas flow; second, flooding the system to a poor vacuum range; and third, control steadily with no drifting.

As noted, the thin wall section of the leak body is protected from cooling influences of the surrounding media. This arrangement is necessary since in the conventional positive ion accelerator both the ion source and the evacuated acceleration tube are enclosed within a large tank containing an insulating gas under pressure which has a cooling effect.

Operation of a typical thermomechanical leak is indicated by Table III:

*Table III*

| Amperes | Volts | Cc./Hr. |
|---|---|---|
| 54 | .27 | 3.5 |
| 50 | .25 | 2.8 |
| 48 | .23 | 2.4 |
| 46 | .22 | 2.1 |
| 44 | .21 | 1.6 |
| 42 | .20 | 1.03 |
| 35 | .11 | .84 |
| 30 | .09 | .5 |

The operating temperature of the thin wall section will be approximately 200° F. and the bottle gas pressure for this data as given above was 200 p.s.i.

As indicated above, the thermomechanical leak has to be properly oriented so that the steel ball has the forces of the gas cylinder pressure and the vacuum attempting to push and pull the ball from its natural seat respectively. As the current is applied, the forces acting on the ball are relaxed which, in turn, allows gas to flow past the ball.

Having thus described the principles of the invention, together with an illustrative embodiment thereof, it is to be understood that, although specific terms are employed, they are used in a generic and descriptive sense, and not for purposes of limitation, the scope of the invention being set forth in the following claims:

I claim:

1. A thermomechanical gas leak adapted to control the admittance of gas into a high vacuum region comprising in combination: a tube of electrically conductive material, a ball-body and a screw-body each having apertures therethrough and having tube sockets at one end of said apertures receiving said tube therebetween in mutually fixed spatial relationship, said screw-body having a threaded socket below said tube socket, a series comprising a ball, a first wafer, an insulating rod, and a second wafer arranged in that order within said tube, a set screw, having an axial aperture and a slotted head, said set screw engaging said threaded socket so that when the gas leak is at the coolest part of its operating range of temperatures the length of said series slightly exceeds the length of said tube so that said ball is held against the aperture of said ball-body by the mechanical force exerted by said set screw on said ball through said second wafer, said insulating rod, and said first wafer, and means for applying and controlling a potential difference across said tube, whereby the expansion of the various members of the gas leak due to the heating effect of the electric current produced in said tube by said potential difference results in a controllable separation of said ball from the aperture of said ball-body.

2. A thermomechanical gas leak adapted to control the admittance of gas into a high vacuum region comprising in combination: a tube of electrically conductive material, a ball-body and a screw-body each having apertures therethrough and having tube sockets at one end of said apertures receiving said tube therebetween in mutually fixed spatial relationship, said screw-body having a threaded socket below said tube socket, a series comprising a ball, a first wafer, a rod of insulating material whose coefficient of expansion in inches per inch per degree Fahrenheit is substantially less than that of said tube, and a second wafer arranged in that order within said tube, a set screw, having an axial aperture and a slotted head, said set screw engaging said threaded socket so that when the gas leak is at the coolest part of its operating range of temperatures the length of said series slightly exceeds the length of said tube so that said ball is held against the aperture of said ball-body by the mechanical force exerted by said set screw on said ball through said second wafer, said insulating rod, and said first wafer, and means for applying and controlling a potential difference across said tube, whereby the expansion of the various members of the gas leak due to the heating effect of the electric current produced in said tube by said potential difference results in a controllable separation of said ball from the aperture of said ball-body.

3. A thermomechanical gas leak adapted to control the admittance of gas into a high vacuum region comprising in combination: a tube of Iconel, a stainless steel ball-body and a stainless steel screw-body each having apertures therethrough and having tube sockets at one end of said apertures receiving said tube therebetween in mutually fixed spatial relationship, said screw-body having a threaded socket below said tube socket, a series comprising a stainless steel ball, a first tungsten wafer, a quartz rod, and a second tungsten wafer arranged in that order within said tube, a set screw, having an axial aperture and a slotted head, said set screw engaging said threaded socket so that when the gas leak is at the coolest part of its operating range of temperatures the length of said series slightly exceeds the length of said tube so that said ball is held against the aperture of said ball-body by the mechanical force exerted by said set screw on said ball through said second wafer, said insulating rod, and said first wafer, and means for applying and controlling a potential difference across said tube, whereby the expansion of the various members of the gas leak due to the heating effect of the electrical current produced in said tube by said potential difference results in a controllable separation of said ball from the aperture of said ball-body.

References Cited in the file of this patent

UNITED STATES PATENTS

| | | |
|---|---|---|
| 1,697,432 | Martin | Jan. 1, 1929 |
| 2,608,996 | Forman | Sept. 2, 1952 |
| 2,647,017 | Coulliette | July 28, 1953 |